(12) United States Patent  (10) Patent No.: US 10,781,764 B2
Egashira  (45) Date of Patent: Sep. 22, 2020

(54) TARGET TORQUE CONTROL DEVICE AND TARGET TORQUE CONTROL METHOD

(71) Applicant: Honda Motor Co., Ltd., Tokyo (JP)

(72) Inventor: Fumio Egashira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/351,524

(22) Filed: Mar. 13, 2019

(65) Prior Publication Data

US 2019/0285014 A1  Sep. 19, 2019

(30) Foreign Application Priority Data

Mar. 15, 2018 (JP) .................. 2018-048119

(51) Int. Cl.
*F02D 41/02* (2006.01)
*F16H 3/66* (2006.01)

(52) U.S. Cl.
CPC .............. *F02D 41/022* (2013.01); *F16H 3/66* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS

| 5,865,709 | A * | 2/1999 | Tamura | B60W 10/02 |
| | | | | 477/181 |
| 7,131,933 | B2 * | 11/2006 | Tabata | B60K 6/32 |
| | | | | 477/181 |
| 8,065,064 | B2 * | 11/2011 | Ikeda | F16H 61/0213 |
| | | | | 701/51 |
| 8,296,028 | B2 * | 10/2012 | Matsunaga | F16H 61/143 |
| | | | | 192/3.31 |
| 10,308,253 | B2 * | 6/2019 | Tohta | F16H 63/50 |

FOREIGN PATENT DOCUMENTS

| CN | 104334860 | | 2/2015 |
| JP | 2000002313 | A * | 1/2000 |
| JP | 2008157190 | | 7/2008 |
| JP | 2010159722 | | 7/2010 |
| JP | 4867725 | | 2/2012 |

OTHER PUBLICATIONS

"Office Action of Japan Counterpart Application," with English translation thereof, dated Feb. 4, 2020, p. 1-p.8.
Office Action of China Counterpart Application, with English translation thereof, dated May 8, 2020, pp. 1-14.

* cited by examiner

*Primary Examiner* — Dirk Wright
(74) *Attorney, Agent, or Firm* — JCIPRNET

(57) ABSTRACT

A target torque control device and a target torque control method capable of maintaining a temperature within an allowable temperature even when a lock-up clutch is engaged are provided. In a target torque control device (ECU) for setting a target torque of a prime mover (E) that outputs a torque to a multi-stage transmission (3) including a torque converter (2) and a lock-up clutch (2a), when the lock-up clutch (2a) is in an engaged state (STEP 1), a target torque reduction control for reducing a target torque of the prime mover (E) (STEP 3) is executed so that an output torque of the prime mover (E) becomes an output torque at which a heat generation temperature of the lock-up clutch (2a) does not exceed an allowable temperature during the up-shift transmission (STEP 2).

5 Claims, 5 Drawing Sheets

| | C1 | C2 | C3 | B1 | B2 | B3 | F1 | GEAR RATIO | COMMON RATIO |
|---|---|---|---|---|---|---|---|---|---|
| Rvs | | | ○ | | ○ | | L | 4.008 | |
| 1st | | | | ○ | (○) | | R/L | 5.233 | 1.554 |
| 2nd | | ○ | | ○ | ○ | | R | 3.367 | 1.465 |
| 3rd | | | ○ | ○ | ○ | | R | 2.298 | 1.348 |
| 4th | | ○ | ○ | ○ | | | R | 1.705 | 1.251 |
| 5th | ○ | | (○) | ○ | | | R | 1.363 | 1.363 |
| 6th | ○ | ○ | ○ | | | | R | 1.000 | 1.273 |
| 7th | ○ | | ○ | | ○ | | R | 0.786 | 1.196 |
| 8th | ○ | ○ | | | ○ | | R | 0.657 | 1.126 |
| 9th | ○ | | | | ○ | ○ | R | 0.584 | 1.120 |
| 10th | ○ | ○ | | | | ○ | R | 0.520 | |

TARGET TORQUE CONTROL DEVICE AND TARGET TORQUE CONTROL METHOD

CROSS-REFERENCE TO RELATED APPLICATION

This application claims the priority benefit of Japan application serial no. 2018-048119, filed on Mar. 15, 2018. The entirety of the above-mentioned patent application is hereby incorporated by reference herein and made a part of this specification.

BACKGROUND

Technical Field

The disclosure relates to a target torque control device and a target torque control method for setting a target torque of a prime mover that outputs a torque to a multi-stage transmission including a torque converter and a lock-up clutch.

Description of Related Art

In the related art, a multi-stage transmission, which includes a torque converter and a lock-up clutch, and a prime mover that outputs a torque to the multi-stage transmission are known (see, for example, Patent Document 1). In Patent Document 1, a damper having two types of springs having different spring constants is included, and when a lock-up clutch is engaged, an output torque of the prime mover is reduced relative to a predetermined torque at which the spring constant of the damper changes, thereby reducing vibration.

PATENT DOCUMENTS

[Patent Document 1] Japanese Patent No. 4867725

In recent years, an output of a prime mover has been increased, and a range exceeding an allowable temperature of a lock-up clutch is increased when the lock-up clutch is engaged. When it is assumed that the lock-up clutch exceeds the allowable temperature, the lock-up clutch cannot be engaged and remains released, which worsens acceleration performance.

The disclosure is to provide a required torque control device and a required torque control method capable of maintaining a temperature within an allowable temperature even when a lock-up clutch is engaged.

SUMMARY

The disclosure is a shift control device (for example, a target torque control device ECU of an embodiment. The same applies hereinafter.) that sets a target torque of a prime mover (for example, an engine E in an embodiment. The same applies hereinafter) that outputs a torque to a multi-stage transmission (for example, a multi-stage transmission 3 in an embodiment. The same applies hereinafter.) including a torque converter (for example, a torque converter 2 in an embodiment. The same applies hereinafter.) and a lock-up clutch (for example, a lock-up clutch 2a in an embodiment. The same applies hereinafter.), wherein the lock-up clutch is configured to be switched between an open state in which the output torque of the prime mover is transmitted to the multi-stage transmission via the torque converter and an engaged state in which the output torque of the prime mover is directly transmitted to the multi-transmission without passing through the torque converter, and the target torque control device is configured that: when the lock-up clutch is in the engaged state (for example, YES in STEP 1 in FIG. 5 in an embodiment. The same applies hereinafter.), target torque reduction control for reducing the target torque of the prime mover (for example, in STEP 3 in FIG. 5 in an embodiment. The same applies hereinafter.) is executed so that the output torque of the prime mover becomes an output torque at which a heat generation temperature of the lock-up clutch does not exceed an allowable temperature during an up-shift transmission (for example, YES in STEP 2 in FIG. 5 in an embodiment. The same applies hereinafter.).

DESCRIPTION OF THE EMBODIMENTS

Figure 1:
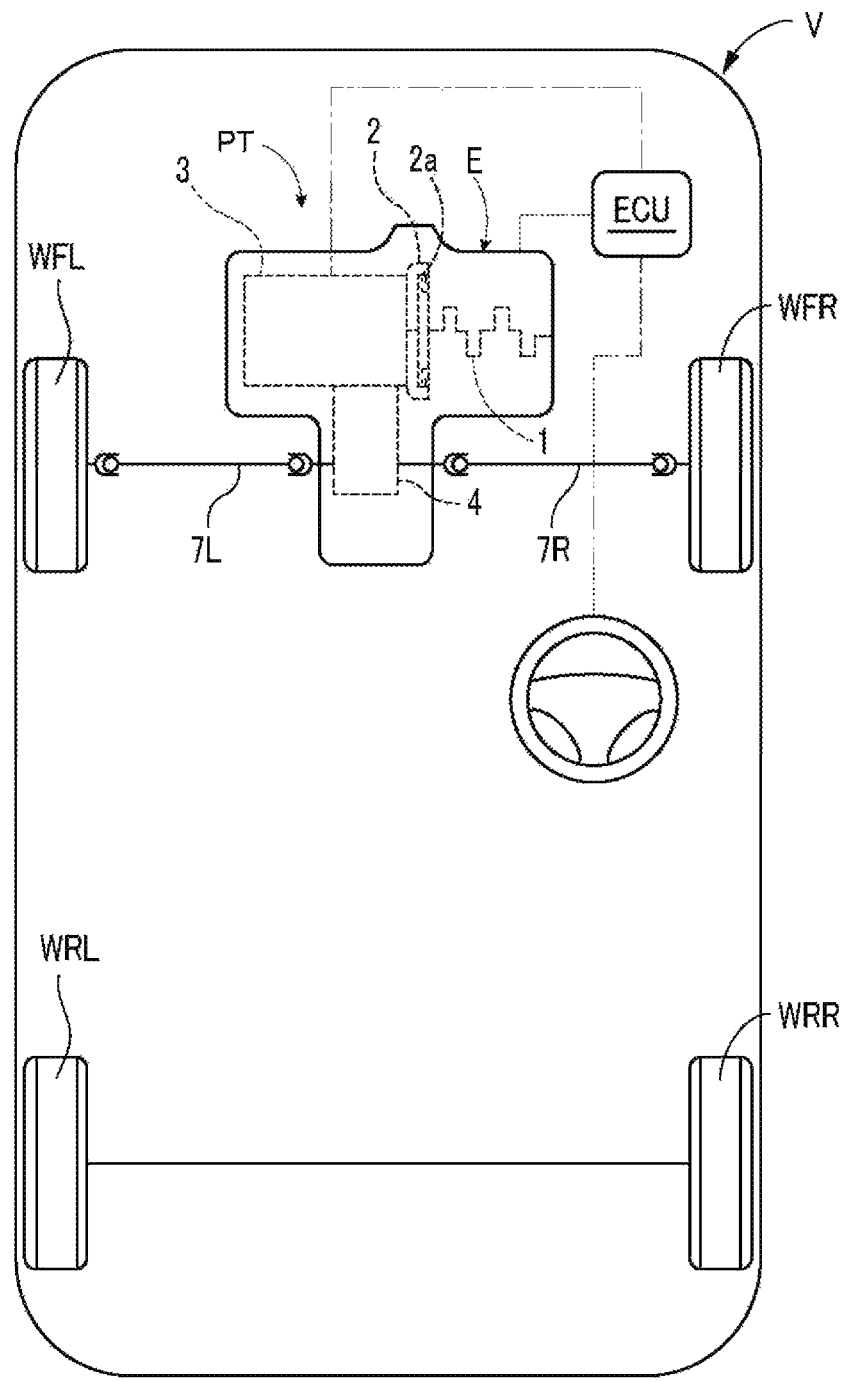
FIG. 1 is an illustrative diagram schematically illustrating a vehicle in which a multi-stage transmission including a target torque control device according to an embodiment is mounted.

According to the disclosure, it is possible to maintain a temperature within the allowable temperature even when the lock-up clutch is engaged since a required torque of the prime mover is reduced. Further, since the reduction of the required torque is performed during shift in which the torque changes, it is possible to reduce the sense of discomfort of the torque change that is given to a driver due to the reduction of the required torque.

Further, in the disclosure, control is performed so that the target torque reduction control is executed in a torque phase during the up-shift transmission and is not executed in an inertia phase. According to such a configuration, it is possible to rapidly decrease a rotation speed of the prime mover to a rotation speed corresponding to a gear stage after up-shift transmission in the inertia phase.

In the disclosure, the target torque reduction control may be executed in a case in which it is assumed that the lock-up clutch exceeds the allowable temperature when the lock-up clutch is engaged. According to such a configuration, it is possible to further improve acceleration performance in comparison with a case in which the target torque reduction control is uniformly executed when the lock-up clutch is engaged since it is possible to determine whether or not the lock-up clutch exceeds the allowable temperature and causes the target torque reduction control to be executed.

Further, the disclosure is a target torque control method for setting a target torque of a prime mover that outputs a torque to a multi-stage transmission including a torque converter and a lock-up clutch, wherein the lock-up clutch is configured to be switched between an open state in which the output torque of the prime mover is transmitted to the multi-stage transmission via the torque converter and an engaged state in which the output torque of the prime mover is directly transmitted to the multi-transmission without passing through the torque converter, and when the lock-up clutch is in an engaged state, target torque reduction control for reducing the target torque of the prime mover is executed so that the output torque of the prime mover becomes an output torque at which a heat generation temperature of the lock-up clutch does not exceed an allowable temperature during up-shift transmission.

According to the disclosure, it is possible to maintain a temperature within the allowable temperature even when the lock-up clutch is engaged since a required torque of the prime mover is reduced. Further, since the reduction of the required torque is performed during shift in which the torque changes, it is possible to reduce the sense of discomfort of the torque change that is given to a driver due to the reduction of the required torque.

A multi-stage transmission that includes a target torque control device according to the embodiment or to which a target torque control method has been applied, and a vehicle in which the multi-stage transmission is mounted will be described with reference to the drawings.

As illustrated in FIG. 1, in a vehicle V including a multi-stage transmission including a target torque control device according to the embodiment, an engine E (internal combustion engine; drive source. An electric motor may be used instead of the engine E.) is mounted in a vehicle body in a horizontal direction such that a crankshaft 1 is directed in a lateral direction of the vehicle body. The driving force output from the engine E is transmitted to a power transmission device PT. The power transmission device PT adjusts the driving force of the engine E in correspondence to a selected gear ratio and transmits a resultant driving force to left and right front wheels WFL and WFR.

The power transmission device PT includes the multi-stage transmission 3 including the torque converter 2 connected to the crankshaft 1 and a front differential gear 4 connected to the multi-stage transmission 3. The torque converter 2 includes a lock-up clutch 2a for directly inputting rotation of the crankshaft 1 to the multi-stage transmission 3 without increasing a torque thereof. The lock-up clutch 2a is switched between an engaged state and an open state. In the engaged state, the lock-up clutch 2a directly inputs the rotation of the crankshaft 1 to the multi-stage transmission 3 without increasing the torque, and in the released state, power transmission via the lock-up clutch 2a is interrupted and the torque is increased and input to the multi-stage transmission 3.

The front differential gear 4 is connected to left and right front wheels WFL and WFR via a front left shaft 7L and a front right shaft 7R.

Figure 2:
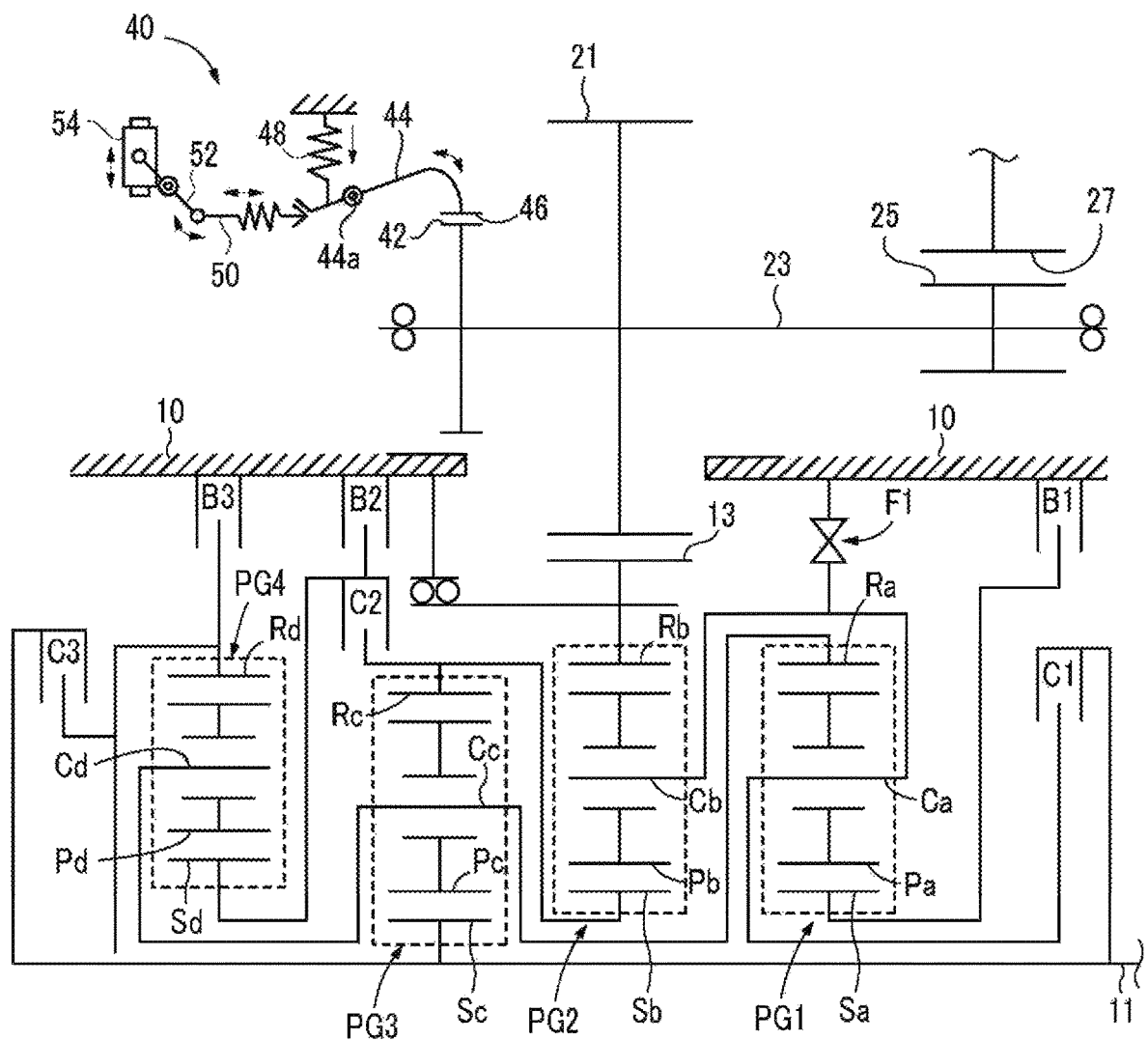
FIG. 2 is a skeleton diagram illustrating a multi-stage transmission of the embodiment.

FIG. 2 is a skeleton diagram illustrating portions of the multi-stage transmission 3 other than the torque converter 2. The multi-stage transmission 3 includes an input shaft 11 serving as an input unit in which a driving force output by the engine E serving as a prime mover is transmitted via the torque converter 2 including a lock-up clutch and a damper, which is pivotally supported in a transmission casing 10 serving as a body, and an output member 13 serving as an output unit formed of an output gear arranged concentrically with the input shaft 11.

Rotation of the output member 13 is transmitted to left and right driving wheels (front wheels WFL and WFR) of the vehicle via the front differential gear 4 including an idle gear 21 that meshes with the output member 13, an idle shaft 23 that pivotally supports the idle gear 21, a final drive gear 25 that is pivotally supported by the idle shaft 23, and a final driven gear 27 that meshes with the final drive gear 25. Further, a propeller shaft can be connected instead of the front differential gear 4 and applied to a rear wheel drive vehicle. Further, the propeller shaft can be connected to the front differential gear 4 via a transfer and applied to a four-wheel drive vehicle.

Four planetary gear mechanisms including first to fourth planetary gear mechanisms PG1 to PG4 are arranged concentrically with the input shaft 11 in order from the engine E side in the transmission casing 10 serving as a body.

The first planetary gear mechanism PG1 is configured as a so-called single pinion type planetary gear mechanism including a sun gear Sa, a ring gear Ra, and a carrier Ca that rotatably and pivotally supports a pinion Pa meshed with the sun gear Sa and the ring gear Ra.

The so-called single pinion type planetary gear mechanism is also called a minus planetary gear mechanism or a negative planetary gear mechanism since the ring gear rotates in a direction different from the sun gear when the carrier is locked and the sun gear is rotated. It should be noted that in the so-called single pinion type planetary gear mechanism, when the ring gear is locked and the sun gear is rotated, the carrier rotates in the same direction as the sun gear.

Figure 3:
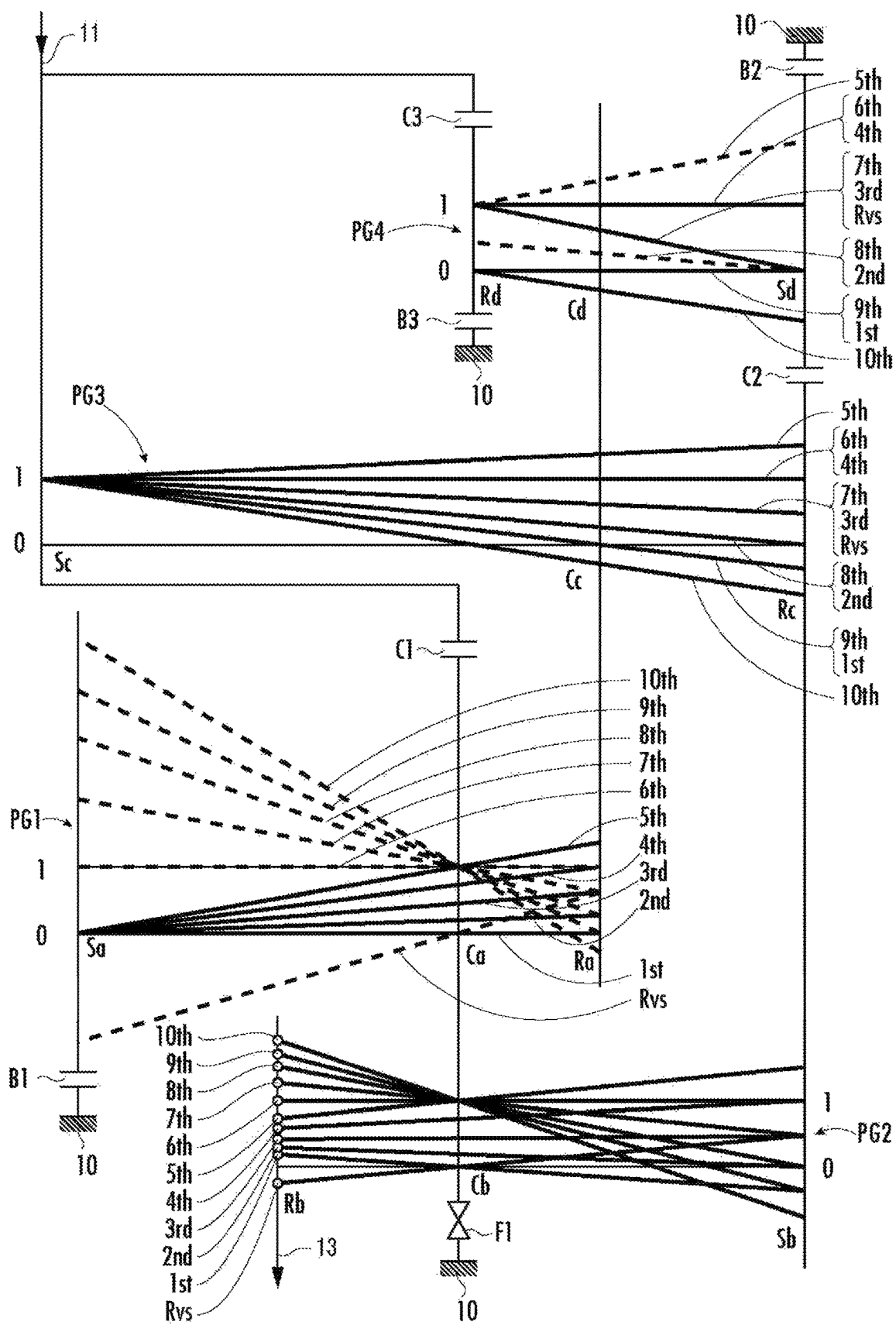
FIG. 3 is an alignment chart of a planetary gear mechanism of the embodiment.

Referring to an alignment chart of the first planetary gear mechanism PG1 shown in a third row from the top in FIG. 3, when the three elements Sa, Ca, and Ra of the first planetary gear mechanism PG1 are respectively set as a seventh element, an eighth element, and a ninth element from the left side in an alignment order at an interval corresponding to a gear ratio (number of teeth of the ring gear/number of teeth of the sun gear) in the alignment chart, the seventh element is the sun gear Sa, the eighth element is the carrier Ca, and the ninth element is the ring gear Ra. A ratio between an interval between the sun gear Sa and the carrier Ca and an interval between the carrier Ca and the ring gear Ra is set to h:1, where h is a gear ratio of the first planetary gear mechanism PG1.

The second planetary gear mechanism PG2 is configured as a so-called single pinion type planetary gear mechanism including a sun gear Sb, a ring gear Rb, and a carrier Cb that rotatably and pivotally supports a pinion Pb meshed with the sun gear Sb and the ring gear Rb.

Referring to an alignment chart of the second planetary gear mechanism PG2 shown in a fourth row (lowermost stage) from the top in FIG. 3, when the three elements Sb, Cb, and Rb of the second planetary gear mechanism PG2 are respectively set as a tenth element, an eleventh element, and a twelfth element from the left side in an alignment order at an interval corresponding to a gear ratio in the alignment chart, the tenth element is the ring gear Rb, the eleventh element is the carrier Cb, and the twelfth element is the sun gear Sb. A ratio between an interval between the ring gear Sb and the carrier Cb and an interval between the carrier Cb and the ring gear Rb is set to i:1, where i is a gear ratio of the second planetary gear mechanism PG2.

The third planetary gear mechanism PG3 is configured as a so-called single pinion type planetary gear mechanism including a sun gear Sc, a ring gear Rc, and a carrier Cc that rotatably and pivotally supports a pinion Pb meshed with the sun gear Sc and the ring gear Rc.

Referring to an alignment chart of the third planetary gear mechanism PG3 (a diagram that can express a ratio of a relative rotation speed of three elements of the sun gear, the carrier, and the ring gear in a straight line (a speed line)) shown in a second row from the top in FIG. 3, when the three elements Sc, Cc, and Rc of the third planetary gear mechanism PG3 are respectively set as a first element, a second element, and a third element from the left side in an alignment order at an interval corresponding to a gear ratio in the alignment chart, the first element is the sun gear Sc, the second element is the carrier Cc, and the third element is the ring gear Rc.

Here, a ratio between an interval between the sun gear Sc and the carrier Cc and an interval between the carrier Cc and the ring gear Rc is set to j:1, where j is "a gear ratio of the third planetary gear mechanism PG3". It should be noted that in the alignment chart, a lower horizontal line and an upper horizontal line (lines overlapping fourth and sixth lines) respectively indicate that the rotation speed is "0" and "1" (the same rotation speed as that of the input shaft 11).

The fourth planetary gear mechanism PG4 is configured as a so-called single pinion type planetary gear mechanism including a sun gear Sd, a ring gear Rd, and a carrier Cd that rotatably and pivotally supports a pinion Pd meshed with the sun gear Sd and the ring gear Rd.

Referring to an alignment chart of the fourth planetary gear mechanism PG4 shown in a first row (uppermost stage) from the top in FIG. 3, when the three elements Sd, Cd, and Rd of the fourth planetary gear mechanism PG4 are respectively set as a fourth element, a fifth element, and a sixth element from the left side in an alignment order at an interval corresponding to a gear ratio in the alignment chart, the fourth element is the ring gear Rd, the fifth element is the carrier Cd, and the sixth element is the sun gear Sd. A ratio between an interval between the ring gear Sd and the carrier Cd and an interval between the carrier Cd and the ring gear Rd is set to k:1, where k is a gear ratio of the fourth planetary gear mechanism PG4.

The sun gear Sc (the first element) of the third planetary gear mechanism PG3 is connected to the input shaft 11. Further, the ring gear Rb (the tenth element) of the second planetary gear mechanism PG2 is coupled to the output member 13 configured as an output gear.

Further, the carrier Cc (the second element) of the third planetary gear mechanism PG3, the carrier Cd (the fifth element) of the fourth planetary gear mechanism PG4, and the ring gear Ra (the ninth element) of the first planetary gear mechanism PG1 are coupled to constitute a first connection body Cc-Cd-Ra. Further, the ring gear Re (the third element) of the third planetary gear mechanism PG3 and the sun gear Sb (the twelfth element) of the second planetary gear mechanism PG2 are connected to constitute a second connection body Rc-Sb. Further, the carrier Ca (the eighth element) of the first planetary gear mechanism PG1 and the carrier Cb (the eleventh element) of the second planetary gear mechanism PG2 are connected to constitute a third connection body Ca-Cb.

Further, the multi-stage transmission of the embodiment includes seven engagement mechanisms including first to third three clutches C1 to C3, first to third three brakes B1 to B3, and one two-way clutch F1.

The first clutch C1 is a hydraulically actuated wet type multi-disc clutch and is configured to be switched between a connected state, in which the sun gear Sc (the first element) of the third planetary gear mechanism PG3 and the third connection body Ca-Cb are connected, and an open state, in which the connection is disconnected.

The third clutch C3 is a hydraulically actuated wet type multi-disc clutch and is configured to be switched between a connected state, in which the sun gear Sc (the first element) of the third planetary gear mechanism PG3 and the ring gear Rd (the fourth element) of the fourth planetary gear mechanism PG4 are connected, and an open state, in which the connection is disconnected.

The second clutch C2 is a hydraulically actuated wet type multi-disc clutch and is configured to be switched between a connected state, in which the sun gear Sd (the sixth element) of the fourth planetary gear mechanism PG4 and the second connection body Rc-Sb are connected, and an open state, in which the connection is disconnected.

The two-way clutch F1 also functions as a fourth brake B4, and is configured to be switched between a reverse rotation prevention state in which forward rotation of the third connection body Ca-Cb (rotation in the same direction as a rotation direction of the input shaft 11 and/or a rotation direction of the output member 13 when the vehicle is moving forward) is allowed, and reverse rotation (rotation direction opposite to the forward rotation) is prevented and a locked state in which the third coupling member Ca-Cb is locked to the transmission casing 10.

In the reverse rotation prevention state, the two-way clutch F1 enters an open state, in which rotation is allowed when a force for rotation in a forward rotation direction is applied to the third connection body Ca-Cb, and enters a locked state, in which the rotation is prevented and locked to the transmission casing 10 when a force for rotation in a reverse rotation direction is applied.

The first brake B1 is a hydraulically actuated wet multi-disc brake and is configured to be switched between a locked state in which the sun gear Sa (the seventh element) of the first planetary gear mechanism PG1 is locked to the transmission casing 10 and an open state in which the locking is released.

The second brake B2 is a hydraulically actuated wet multi-disc brake and is configured to be switched between a locked state, in which the sun gear Sd (the sixth element) of the fourth planetary gear mechanism PG4 is locked to the transmission casing 10, and an open state, in which the locking is released. The third brake B3 is a hydraulically actuated wet multi-disc brake and is configured to be switched between a locked state, in which the ring gear Rd (the fourth element) of the fourth planetary gear mechanism PG4 is locked to the transmission casing 10, and an open state, in which the locking is released.

Each of the clutches C1 to C3, each of the brakes B1 to B3, and the two-way clutch F1 are switched between states on the basis of vehicle information such as a traveling speed of the vehicle that is transmitted from an integrated control unit (not illustrated) or the like by a shift control device ECU including a transmission control unit TCU illustrated in FIG. 1.

The shift control device ECU includes an electronic unit including a CPU (central processing unit) (not illustrated), a memory, and the like. The shift control device ECU can receive predetermined vehicle information such as a traveling speed of the vehicle V, an accelerator opening degree, a rotation speed or output torque of the engine E, and operation information of a shift lever, and controls the multi-stage transmission 3 (a transmission mechanism) by the CPU executing a control program held in a storage device such as a memory.

A speed line indicated by a dotted line in FIG. 3 indicates that each element of the other planetary gear mechanism rotates (idle rotation) following the planetary gear mechanism that transmits power among the four planetary gear mechanisms PG1 to PG4.

Figures 4, 5:
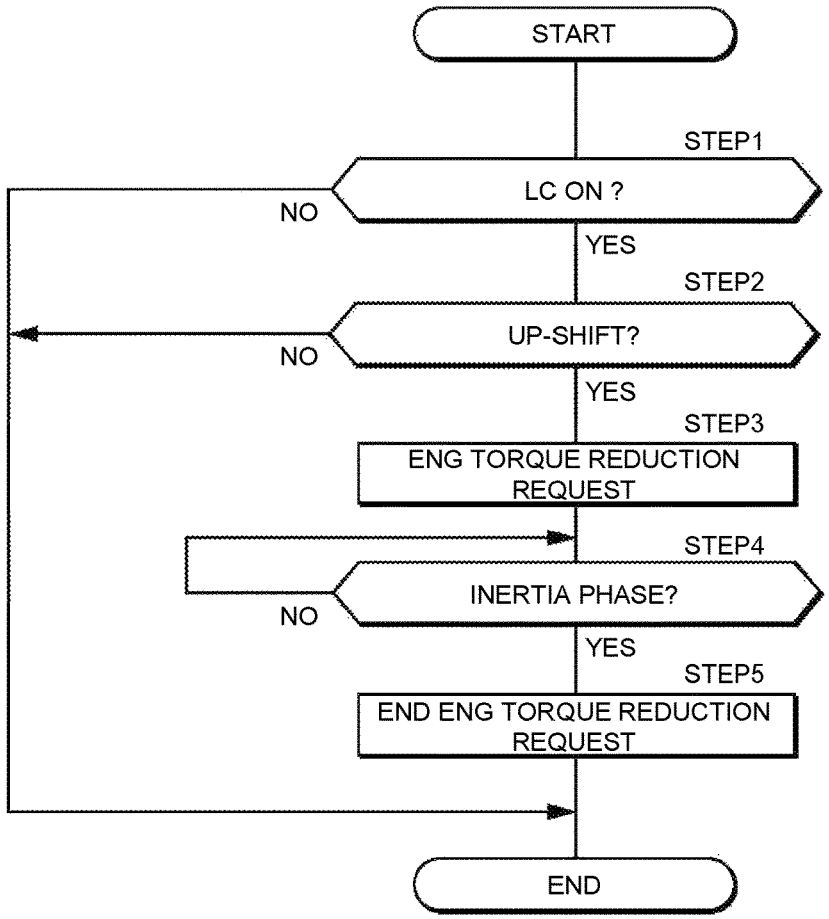
FIG. 4 is an illustrative diagram illustrating an engaged state of each engagement mechanism in each gear stage of the embodiment.
FIG. 5 is a flowchart showing an operation of the target torque control device and a target torque control method according to the embodiment.

FIG. 4 is a diagram collectively illustrating states of the clutches C1 to C3, the brakes B1 to B3, and the two-way clutch F1 in each gear stage. "0" in columns of three clutches including the first to third clutches C1 to C3 and of the three brakes including the first to third brakes B1 to B3 indicates the connected state or the locked state, and a blank column indicates the open state. Further, "R" in the column of the two-way clutch F1 indicates a reverse rotation prevention state, and "L" indicates the locked state.

Further, underlined "R" and "L" indicate that a rotation speed of the third connection body Ca-Cb becomes "0" due to an action of the two-way clutch F1. Further, "R/L" indicates a reverse rotation prevention state "R" in a normal state but indicates switching to the locked state "L" when an engine brake is activated.

Further, FIG. 4 illustrates a gear ratio of each gear stage (rotation speed of the input shaft 11/rotation speed of the output member 13) when a gear ratio h of the first planetary gear mechanism PG1 is set to 2.681, a gear ratio i of the second planetary gear mechanism PG2 is set to 1.914, a gear ratio j of the third planetary gear mechanism PG3 is set to 2.734, and a gear ratio k of the fourth planetary gear mechanism PG4 is set to 1.614, and a common ratio (a ratio of the gear ratio between the respective gear stages. A value obtained by dividing a gear ratio of a predetermined gear stage by a gear ratio of a gear stage that is on one gear higher speed side than the predetermined gear stage). It can be seen that the common ratio can be appropriately set.

In the embodiment, the four planetary gear mechanisms including the first to fourth planetary gear mechanisms PG1 to PG4, the respective clutches C1 to C3, and the respective brakes B1 to B3, and the two-way clutch F1 correspond to a shift unit.

Figure 6:
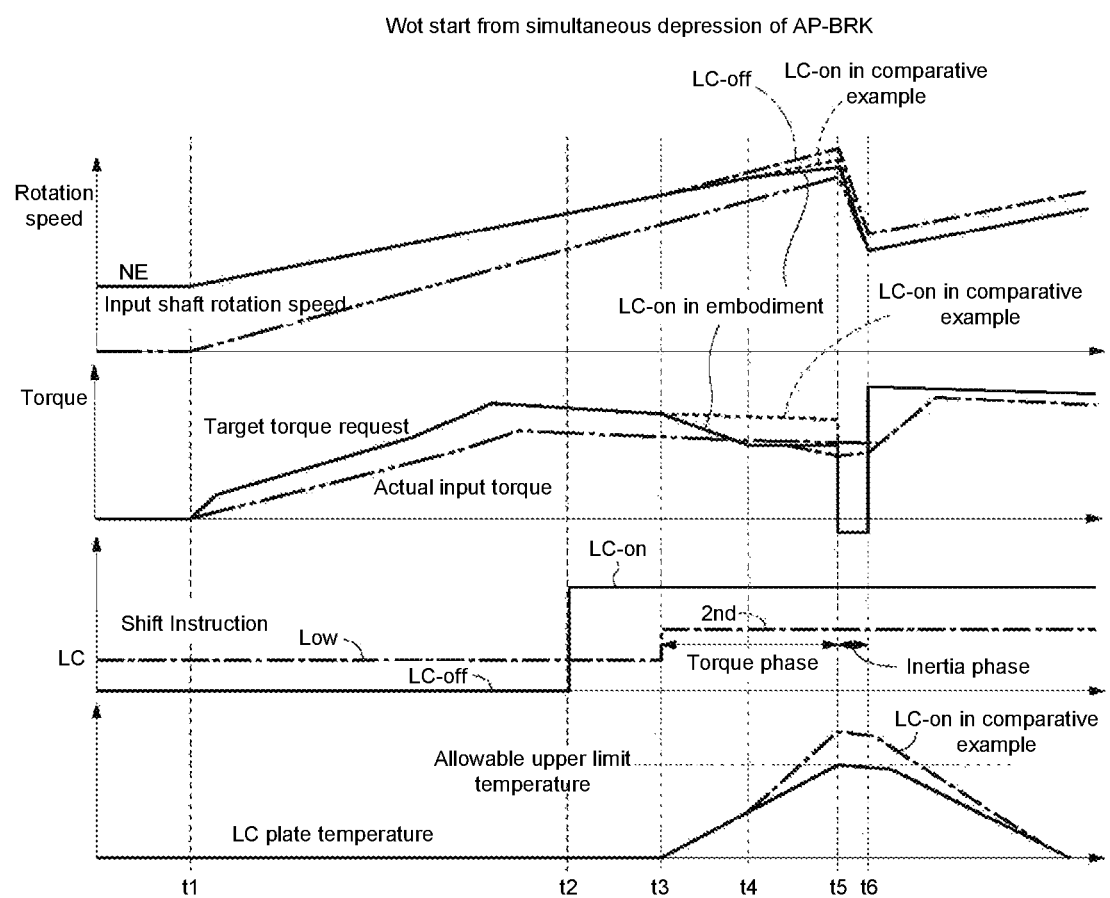
FIG. 6 is a timing chart showing a case of fully opening acceleration in the target torque control device of the embodiment.

FIG. 5 is a flowchart showing an operation of the shift control device ECU. The shift control device ECU repeatedly executes a process of FIG. 5 at a predetermined control cycle (for example, 10 ms). In the embodiment, the shift control device ECU also functions as the target torque control device of the disclosure. FIG. 6 is a timing chart showing one operation example of the shift control device ECU when a stopped vehicle starts with fully opening acceleration through release of only a brake pedal from a state in which an accelerator pedal and the brake pedal are both depressed. Time t1 in FIG. 6 indicates a time when the brake pedal is released and the vehicle starts at a first gear.

In FIG. 6, a horizontal axis indicates a time axis, and a vertical axis indicates a rotation speed, a torque, a shift command signal, a lock-up clutch command signal, and a plate temperature of the lock-up clutch 2a. A dotted line at a rotation speed stage in FIG. 6 indicates a rotation speed of a prime mover when the lock-up clutch as a comparative example is engaged and the target torque reduction control is not executed. An alternated long and short dash line in the rotation speed stage in FIG. 6 indicates the rotation speed of the prime mover when the lock-up clutch is not engaged. A dotted line of the torque stage in FIG. 6 indicates a target torque request value when the lock-up clutch as the comparative example is engaged and the target torque reduction control is not executed. An alternated long and short dash line of a plate temperature stage of the lock-up clutch at a lowermost stage in FIG. 6 indicates the plate temperature when the lock-up clutch as the comparative example is engaged and the target torque reduction control is not executed. Further, the plate temperature of the lock-up clutch 2a is estimated by the shift control device ECU according to a difference between an in-side rotation speed and an out-side rotation speed in a power transmission path of the lock-up clutch 2a (hereinafter referred to as a differential rotation), a temperature of lubricating oil, whether the lock-up clutch 2a is in the engaged state or in the released state, or the like.

Referring to FIGS. 5 and 6, in STEP 1, the shift control device ECU first confirms whether or not the lock-up clutch 2a is engaged, and whether or not the temperature of the lock-up clutch 2a is likely to exceed an allowable temperature when the lock-up clutch 2a is in an engaged state. It should be noted that when the lock-up clutch is highly likely to exceed the allowable temperature in all the regions in the corresponding shift mode (first speed up-shift to second speed up-shift) in a state in which the lock-up clutch 2a is engaged, the process may proceed to STEP 2 when the lock-up clutch 2a is engaged without confirming whether or not the lock-up clutch exceeds the allowable temperature in STP 1. Further, the allowable temperature of the lock-up clutch 2a is appropriately set according to a capacity of the lock-up clutch 2a, an allowable temperature of the lubricating oil of the multi-stage transmission, and the like.

When it is assumed that the lock-up clutch 2a is engaged (time t2 in FIG. 6) and the temperature of the lock-up clutch 2a exceeds the allowable temperature, the process proceeds to STEP 2 in which it is confirmed whether or not an up-shift request has been issued. When the up-shift request has not been issued, the current process ends as it is.

When the up-shift request is issued in STEP 2 (time t3 in FIG. 6), the process proceeds to STEP 3, in which a LC low target torque request is issued to reduce the target torque of the prime mover in a torque phase which is the engaged state of both of a first speed stage clutch and a second speed stage clutch during up-shift so that the plate temperature of the lock-up clutch 2a does not exceed a predetermined allowable temperature (target torque reduction control). When another target torque request is issued in addition to the LC (launch control) low target torque request, the shift control device ECU sends a lower torque target request as a target torque request on the transmission side to the prime mover. It should be noted that in the LC low target torque request, it is preferable to perform a gradual subtraction process from a current target torque to the LC low target torque so as to reduce shock due to a sudden torque change so that the target torque does not sharply decrease. Further, the LC low target torque is appropriately set according to a shift mode, a current target torque, and an input shaft rotation speed of the multi-stage transmission.

Then, in STEP 4, the shift control device ECU confirms whether or not the clutch of the first speed stage is released from the torque phase during shifting, and the clutch of the second speed stage is engaged and transitions to an inertia phase that is a state in which the rotation speed of the prime mover exceeds the rotation speed corresponding to the second speed stage. When the clutch does not transition to the inertia phase, the process of STEP 4 is repeated. When the clutch transitions to the inertia phase in STEP 4 (time t5 in FIG. 6), the process proceeds to STEP 5, the LC low target torque request executed in STEP 3 is ended, and the current process is ended. It should be noted that, in the inertia phase, it is preferable to greatly decrease the target torque so that the rotation speed of the prime mover is rapidly decreased to the rotation speed corresponding to the second speed stage since the shift is rapidly completed. Thus, control is performed so that the target torque reduction control in STEP 3 is executed in the torque phase during up-shift transmission and is not executed in the inertia phase, such that the rotation speed of the engine E can be rapidly decreased to a rotation speed corresponding to a gear stage after up-shift in the inertia phase (a rotation speed of the second speed stage in the case of the first and second speed up-shifts).

In STEP 1, when the lock-up clutch 2a is in the released state or when it is assumed that the temperature is within the allowable temperature of the lock-up clutch 2a even when the lock-up clutch 2a is in the engaged state, the current process ends.

According to the control device of the embodiment, in a case in which the up-shift is requested when the lock-up clutch 2a is in the engaged state, reduction of the target torque of the prime mover is requested. Accordingly, it is possible to prevent the lock-up clutch 2a from generating heat beyond the allowable temperature due to too high target torque of the prime mover even when the lock-up clutch 2a is engaged. Further, since the plate temperature of the lock-up clutch 2a can be kept within the allowable temperature without switching the lock-up clutch 2a to the released state, it is possible to prevent deterioration of acceleration performance, for example, when fully opening acceleration is performed.

Further, since the reduction of the required torque is performed during shift in which the torque changes, it is possible to reduce the sense of discomfort of the torque change that is given to a driver due to the reduction of the required torque.

Further, in the embodiment, the target torque reduction control is executed when it is assumed that the lock-up clutch 2a exceeds the allowable temperature when the lock-up clutch 2a is engaged (STEP 1 in FIG. 5). Accordingly, it is possible to determine whether or not the lock-up clutch 2a exceeds the allowable temperature and execute the target torque reduction control. Therefore, it is possible to further improve acceleration performance in comparison with a case in which the target torque reduction control is uniformly executed (a case in which whether or not the lock-up clutch 2a exceeds the allowable temperature is not set as a determination condition in STEP 1 of FIG. 5) when the lock-up clutch 2a is engaged.

Although the embodiment of the disclosure has been described above, various design modifications can be made without departing from the spirit of the disclosure.

Further, in the embodiment, the description has been given using the multi-stage transmission constituted by the planetary gear mechanism, but the disclosure is not limited to the transmission of a planetary gear mechanism ad may be another multi-stage transmission as long as the other multi-stage transmission is a multi-stage transmission including a torque converter and a lock-up clutch.

Further, in the embodiment, the example in which the shift control device ECU includes the functions of the target torque control device and the target torque control method of the disclosure, but the target torque control device and the target torque control method of the disclosure is not limited thereto. For example, an engine control device that controls the engine E may have functions of the target torque control device and the target torque control method of the disclosure.

Further, in the embodiment, the up-shift at the time of fully opening acceleration from the first speed stage to the second speed stage has been described by way of example, but the up-shift of the disclosure is not limited thereto, and for example, the disclosure can be similarly applied to up-shift from the second speed stage to the third speed stage or from the third speed stage to the fourth speed stage.

What is claimed is:

1. A target torque control device that sets a target torque of a prime mover that outputs a torque to a multi-stage transmission including a torque converter and a lock-up clutch, the target torque control device comprising:
a processor;
wherein the lock-up clutch is configured to be switched between an open state in which the output torque of the prime mover is transmitted to the multi-stage transmission via the torque converter and an engaged state in which the output torque of the prime mover is directly transmitted to the multi-transmission without passing through the torque converter, and
wherein the processor is configured to function as:
when the lock-up clutch is in the engaged state,
executing a target torque reduction control for reducing the target torque of the prime mover so that the output torque of the prime mover becomes an output torque at which a heat generation temperature of the lock-up clutch does not exceed an allowable temperature during an up-shift transmission.

2. The target torque control device according to claim 1, wherein the processor is configured to function as executing the target torque reduction control in a torque phase during the up-shift transmission and is not executed in an inertia phase.

3. The target torque control device according to claim 2, wherein the processor is configured to function as executing the target torque reduction control in a case in which it is assumed that the lock-up clutch exceeds the allowable temperature when the lock-up clutch is engaged.

4. The target torque control device according to claim 1, wherein the processor is configured to function as executing the target torque reduction control in a case in which it is assumed that the lock-up clutch exceeds the allowable temperature when the lock-up clutch is engaged.

5. A target torque control method for setting a target torque of a prime mover that outputs a torque to a multi-stage transmission including a torque converter and a lock-up clutch, wherein the lock-up clutch is configured to be switched between an open state in which the output torque of the prime mover is transmitted to the multi-stage transmission via the torque converter and an engaged state in which the output torque of the prime mover is directly transmitted to the multi-transmission without passing through the torque converter, and
the target torque control method performs a function of:
when the lock-up clutch is in the engaged state,
executing a target torque reduction control for reducing the target torque of the prime mover so that the output torque of the prime mover becomes an output torque at which a heat generation temperature of the lock-up clutch does not exceed an allowable temperature during an up-shift transmission.

* * * * *